Patented June 23, 1953

2,643,240

UNITED STATES PATENT OFFICE 2,643,240

POLYSILOXANE ANTIFOAM AGENTS

Richard K. Walton, Montclair, and Philip A. Thomas, East Orange, N. J., assignors to Union Carbide and Carbon Corporation, a corporation of New York No Drawing. Application April 13, 1950, Serial No. 155,780

5 Claims. (Cl. 260—43)

This invention relates to an improvement in polysiloxanes which are suitable as anti-foam agents in the preparation of resins and varnishes for use in the paint and lacquer industry.

Several types of polysiloxanes are now available commercially which are recommended for use as anti-foam agents in the preparation of resins and varnishes. Although the presently available polysiloxanes are effective in reducing or preventing foam in the manufacture of such materials, the products so made have been objectionable to the paint and lacquer industry because coating compositions containing such products have impaired properties. Thus, difficulties have been encountered in coating compositions containing resins or varnishes manufactured with the aid of the presently known siloxanes from lack of adhesion between coats, pigment separation, surface imperfections and lack of uniformity in the coating thickness. In addition, the presently available polysiloxane anti-foam agents cause excessive skinning when employed to prevent foam in the manufacture of oil-modified synthetic resins, or in the manufacture of oleoresinous varnishes when these agents were used to prevent foaming in the preparation of the oil-soluble resin.

According to this invention, polysiloxane anti-foam agents are produced which do not impair the coating properties of compositions containing them and which in fact improve the flow characteristics of such compositions. Also, the improved polysiloxanes do not cause excessive skinning when they are employed as anti-foam agents in cooking oleoresinous materials. The polysiloxanes of this invention are ethyl siloxane polymers having a ratio of ethyl groups to silicon atoms of about 1 to 1 which may be prepared by the hydrolysis and condensation of ethyltrichlorosilane or ethyltriethoxysilane under specified conditions to be described later. It has been found that the degree of condensation of the ethyl polysiloxane polymer is important in avoiding imperfections in coatings containing resins manufactured in the presence of such polysiloxanes as anti-foam agents, and in determining the maximum effectiveness of the polymer as an anti-foam agent. Because of the difficulties in determining molecular weight and structure of the condensed ethyl polysiloxanes, an empirical test has been found necessary to define those materials which are suitable anti-foam agents. Thus, the ethyl siloxane polymers of this invention are of such a degree of condensation that 88 to 94% of the siloxane polymer is not volatilized after heating the polymer for one hour at 200° C. after desolvation for one hour at 145° C. Thus, if 100 parts by weight of the siloxane polymer remain after the first heating period at 145°·C., 88 to 94 parts by weight of the polymer will remain as a residue after the second heating period at 200° C. By comparison, the presently available siloxanes for anti-foam agents are more highly condensed materials, as their content of non-volatile materials, by the same test, is over 99%.

The amount of non-volatile material in the ethyl polysiloxanes of this invention is also a factor in determining the suitability of the products as anti-foam agents because ethyl polysiloxanes containing less than 88% non-volatile material are less effective anti-foam agents in that more of the polysiloxane is required to suppress foam formation, and ethyl polysiloxanes containing more than 94% non-volatile material tend to gel on storage.

The ethyl polysiloxanes of this invention are prepared by the hydrolysis of ethyltrichlorosilane or the corresponding alkoxyesters. If desired, a small amount of silanes having a ratio of alkyl groups to silicon atoms higher than 1 to 1, such as diethyldichlorosilane, may be co-hydrolyzed with the ethyltrichlorosilane or its esters. The products of this hydrolysis are further condensed or "equilibrated" in the presence of a mineral acid catalyst. In this "equilibration" process it is believed that siloxane bonds in polymers having both cyclic and linear structures are ruptured and polymers reformed which have a primarily linear structure and which have a correspondingly higher average molecular weight. The mineral acid may be neutralized at the end of the reaction but this is not essential, and the mineral acid or its salt resulting from neutralization is removed by washing the reaction mixture with water. In general, the final condensation is carried out under conditions so that materials which are volatile at 3 in. Hg. absolute pressure at 120° C. are removed until a product of the specified non-volatile content is obtained. The length of the final heating period may vary from 20 minutes to three hours, the longer times being required when the polysiloxane is formed from ethyltriethoxysilane. It is convenient to carry out the hydrolysis in the presence of an organic solvent, such as dibutyl ether, ethanol, toluene, dioxane or the like. Such solvents are removed in the final condensation under vacuum, and it is again convenient to re-dissolve the final product in a solvent to facilitate handling.

The amount of the ethyl polysiloxanes of this invention required to prevent foaming in a non-aqueous medium is very small; as little as 2 parts per million of the ethyl polysiloxane being frequently effective. Where foaming conditions are severe, more of the ethyl polysiloxane may be used, there being no fixed upper limit. An outstanding application of the ethyl polysiloxanes of this invention is in the prevention of foaming in the manufacture of phenolic resins, where foaming conditions are severe in the final dehydration step in the condensation of a phenol with formaldehyde to form a synthetic resin. In this process, the amounts of the ethyl polysiloxanes employed may vary from 1 to 5 parts per 100,000 parts of the phenols used in making such resins. The ethyl polysiloxanes of this invention are also suitable in preventing foam in the manufacture of other synthetic condensation resins involving the formation of water, as in the manufacture of polyesters by condensing a polyhydric alcohol with a polycarboxylic acid and in the manufacture of polyamides by condensing a diamine with a dicarboxylic acid. In general, therefore, the ethyl polysiloxanes of this invention are useful in preventing foam formation encountered in heating any liquid organic material, as in distillation and evaporation processes, as well as chemical reactions, particularly condensation reactions involving the splitting out of water from the reactants.

The following examples will serve to illustrate the invention:

*Example 1.—Preparation of ethyl polysiloxanes from ethyltriethoxysilane*

Ethyltriethoxysilane (37 lbs.) was charged to a glass-lined still equipped with an agitator, a jacket for heating or cooling, a reflux condenser and having connections to an evacuating pump. Cooling water was circulated through the jacket and hydrolysis was carried out by adding 10.4 lbs. of water and 6.7 grams of 37% HCl as a catalyst. Upon completion of the exothermic hydrolysis reaction, the reaction mixture was homogeneous. The reaction mixture was then refluxed for 30 minutes to insure complete hydrolysis, and then the ethanol product of hydrolysis was distilled off at atmospheric pressure until a final resin or reaction mixture temperature of 105° C. was reached.

Condensation and "equilibration" of the intermediate product formed on hydrolysis was effected by adding 10.4 lbs. of toluene and 14.1 grams of 95.5% $H_2SO_4$ and heating the charge under reflux for 2 hours. The acid catalyst was then removed by washing the charge twice with water. The final condensation and removal of some of the volatile material was carried out by heating the charge at 120° C. under 3 to 3.5 in Hg absolute pressure for 1.5 hours. Toluene (14.5 lbs.) was added and the charge filtered to give a yield of 29.0 lbs. of product solution.

The product solution was heated for one hour at 145° C. to remove the solvent and then heated for one hour at 200° C. On a solvent free basis, about 91 to 92% of the siloxane polymer was not volatilized during the last of these heating periods.

The product solution was an effective anti-foam agent and did not gel after storage for several months at room temperature.

*Example 2.—ethyl polysiloxane from ethyltrichlorosilane*

Ethanol (250 gms.), toluene (300 gms.) and water (250 gms.) were charged to a glass-lined jacket still equipped with a glass-lined reflux condenser and having connections for admitting steam or cooling water to the jacket and for evacuating the system to a reduced pressure. The charge was agitated and cooled to 15 to 20° C. and a mixture of ethyltrichlorosilane (327 gms.) and toluene (200 gms.) were slowly added to the reaction vessel while maintaining the temperature at 30 to 35° C. by cooling. The hydrogen chloride given off in the hydrolysis was removed by heating the reaction mixture to 80° C.

The reaction mixture was allowed to separate into layers and the water layer removed, following by washing of the product layer to remove residual hydrochloric acid. Residual water was removed by refluxing, after which the charge was cooled below 100° C. and 1.62 gms. of 95.5% $H_2SO_4$ were added. Condensation and "equilibration" of the intermediate hydrolysis product was carried out by refluxing the material for 1.5 hours removing the water formed in the condensation. The acid catalyst was neutralized with dilute aqueous caustic soda solution and removed by washing with water. Residual water from the washing operation was removed by heating to reflux. The final condensation of the siloxane and removal of the solvent was carried out by heating to 120° C. at 3 to 3.5 in Hg absolute pressure for 20 minutes. To facilitate handling, 160 grams of toluene were added to the polysiloxane to give a yield of 329 grams of product solution.

The product solution was heated for one hour at 145° C. to remove the solvent and then heated for an additional hour at 200° C. On a solvent free basis 90 to 92% of the siloxane polymer was not volatilized in the second heating period.

The product solution was an effective anti-foam agent and did not gel on storage for several months.

*Example 3*

An oil-soluble para-tertiary-amyl phenol-formaldehyde resin was prepared in five batches. To control foaming in the final dehydration stage in the preparation of four batches of the resin, one part per 100,000 parts of para-tertiary-amyl phenol of the following anti-foam agents was added to the respective batches: commercial siloxane anti-foam "A," commercial siloxane anti-foam "B," ethyl polysiloxane of Example 1 and ethyl polysiloxane of Example 2. Each of the siloxanes was effective in preventing excessive foaming in the dehydration stage of the resin manufacture. Each of the batches was then cooked with tung oil to prepare 1270 grams of a 25-gallon oil length varnish with a Gardner-Holdt viscosity of E at 55% total solids content. The ethyl polysiloxanes caused appreciably less skinning of the varnish on cooking as shown by following amount of skin obtained in each instance:

| Anti-foam agent: | Skin weight (grams) |
|---|---|
| None | 0.3–0.5 |
| Siloxane "A" | 2.2–2.3 |
| Siloxane "B" | 2.3–2.9 |
| Ethyl polysiloxane (Ex. 1) | 1.3–1.6 |
| Ethyl polysiloxane (Ex. 2) | 0.8–1.5 |

The comparative skinning tendencies on storage of the respective siloxanes were shown by removing the skin from the varnishes by filtration, and placing the varnishes to which 0.3% Pb, 0.03% Co and 0.01% Mn as driers were added in containers until half-filled. The varnishes were stored at 25° C. The varnish containing siloxane "B" showed skinning after two days, the varnish containing siloxane "A" exhibited skinning after five days, while the varnish containing the ethyl polysiloxanes did not show any tendency to skin in fourteen days at which time the test was discontinued. Siloxanes "A" and "B" are understood to be methyl polysiloxanes having a ratio of methyl groups to silicon atom of approximately 2 to 1. Similar tendencies toward skin formation were also noted with siloxanes "A" and "B," but not with the ethyl polysiloxanes, in the preparation of linseed oil modified glyceryl-phthalate alkyd resin.

In addition to the above disadvantages, siloxanes "A" and "B" caused surface imperfections of the nature of "craters," "pinholes," "eyes" and the like in baked phenolic resin finishes and in surface coatings containing urea-formaldehyde modified short oil oxidizing type alkyd resin, whereas the ethyl polysiloxanes had no deleterious effect on the coating properties of such finishes, and caused an appreciable improvement in the leveling properties of such coatings.

What is claimed is:

1. An anti-foam agent composed of an ethyl siloxane polymer having a ratio of ethyl groups to silicon atoms of about 1 to 1, said ethyl siloxane polymer having been condensed and equilibrated in the presence of a mineral acid catalyst to such a degree of condensation that, after heating the anti-foam agent for one hour at 145° C. to obtain a residue the residue contains from 88 to 94% by weight of material which does not volatilize on heating such residue for one hour at 200° C.

2. In the processing of liquid organic materials having foaming tendencies, the step of repressing formation of foam during such processing by including with the organic material a minute amount of an anti-foam agent composed of an ethyl siloxane polymer having a ratio of ethyl groups to silicon atoms of about 1 to 1, said ethyl siloxane polymer having been condensed and equilibrated in the presence of a mineral acid catalyst to such a degree of condensation that, after heating the anti-foam agent for one hour at 145° C. to obtain a residue the residue contains from 88 to 94% by weight of material which does not volatilize on heating such residue for one hour at 200° C.

3. In the manufacture of synthetic resin by a condensation reaction, the step of repressing foam during such reaction by including with the reactants a minute amount of an anti-foam agent composed of an ethyl siloxane polymer having a ratio of ethyl groups to silicon atoms of about 1 to 1, said ethyl siloxane polymer having been condensed and equilibrated in the presence of a mineral acid catalyst to such a degree of condensation that, after heating the anti-foam agent for one hour at 145° C. to obtain a residue the residue contains from 88 to 94% by weight of material which does not volatilize on heating such residue for one hour at 200° C.

4. In the manufacture of synthetic resin by condensing a phenol with formaldehyde, the step of repressing foam during the condensation by including with the reactants a minute amount of an anti-foam agent composed of an ethyl siloxane polymer having a ratio of ethyl groups to silicon atoms of about 1 to 1, said ethyl siloxane polymer having been condensed and equilibrated in the presence of a mineral acid catalyst to such a degree of condensation that, after heating the anti-foam agent for one hour at 145° C. to obtain a residue the residue contains from 88 to 94% by weight of material which does not volatilize on heating such residue for one hour at 200° C.

5. A synthetic resin condensation product prepared in the presence of a minute amount of an anti-foam agent composed of an ethyl siloxane polymer having a ratio of ethyl groups to silicon atoms of about 1 to 1, said ethyl siloxane polymer having been condensed and equilibrated in presence of a mineral acid catalyst to such a degree of condensation that, after heating the anti-foam agent for one hour at 145° C. to obtain a residue the residue contains from 88 to 94% by weight of material which does not volatilize on heating such residue for one hour at 200° C., said synthetic resin condensation product containing the added anti-foam agent being adapted to form coating compositions exhibiting adhesion between successive coats and being free from excessive skinning, pigment separation and surface imperfections when applied.

RICHARD K. WALTON.
PHILIP A. THOMAS.

References Cited in the file of this patent

UNITED STATES PATENTS

| Number | Name | Date |
|---|---|---|
| 2,258,220 | Rochow | Oct. 7, 1941 |
| 2,375,998 | McGregor | May 15, 1945 |
| 2,416,503 | Trautman | Feb. 25, 1947 |
| 2,432,891 | Hervey | Dec. 16, 1947 |
| 2,500,843 | MacKenzie | Mar. 14, 1950 |
| 2,508,196 | Seidel | May 16, 1950 |

OTHER REFERENCES

D C Anti-Foam A Dow Corning Silicone Notebook Compound Series No. 1, revised Jan. 1949 (4 pages).

Andrianov Jour. Gen. Chem., U. S. S. R., vol. 8, 1938, pages 1255–1266.